United States Patent [19]

Smith et al.

[11] 4,400,150

[45] * Aug. 23, 1983

[54] FLUIDIZED BED COMBUSTOR DISTRIBUTOR PLATE ASSEMBLY

[75] Inventors: Willard P. Smith; Bruce R. Hutchinson, both of Spring Lake, Mich.

[73] Assignee: Stone-Platt Fluidfire Limited, England

[*] Notice: The portion of the term of this patent subsequent to Aug. 24, 1999 has been disclaimed.

[21] Appl. No.: 198,919

[22] Filed: Oct. 20, 1980

[51] Int. Cl.³ .............................................. F23D 19/00
[52] U.S. Cl. ...................................... 431/170; 431/7; 110/245; 432/58
[58] Field of Search ................... 110/245; 431/7, 170; 122/4 D; 34/57 A; 432/58

[56] References Cited

U.S. PATENT DOCUMENTS

| | | | |
|---|---|---|---|
| 3,198,499 | 8/1965 | Stanley | 432/58 |
| 3,397,657 | 8/1968 | Tada | 110/245 |
| 3,776,150 | 12/1973 | Evans et al. | 110/245 |
| 3,799,747 | 3/1974 | Schmalfeld et al. | 110/245 |
| 3,861,862 | 1/1975 | Steever et al. | 432/58 |
| 3,881,857 | 5/1975 | Hoy et al. | 431/7 |
| 3,914,089 | 10/1975 | Desty et al. | 431/7 |
| 3,979,038 | 9/1976 | Karlsson | |
| 4,171,945 | 10/1979 | Lazenby | 431/7 |
| 4,177,742 | 12/1979 | Uemura et al. | 110/245 |
| 4,253,824 | 3/1981 | Foote | 432/58 |

FOREIGN PATENT DOCUMENTS 2814239  11/1979  Fed. Rep. of Germany.

Primary Examiner—Henry C. Yuen
Attorney, Agent, or Firm—Price, Heneveld, Huizenga & Cooper

[57] ABSTRACT

A fluidized bed combustor having a distributor plate assembly including an inverted frustopyramidal surface with slots and offset shields thereover to form laterally oriented air flow openings into the combustion chamber from a first plenum for debris particle classification along said surface. At the bottom of each frustopyramidal surface is an outlet for classified debris. Air flow riser tubes project up from a second plenum to a position above said surface. Forced air is supplied to the slots and the risers, with means to regulate relative flow to them.

Projecting down from the debris outlets are drop tubes having cooling fins, such tubes connecting to inlets of an auger conveyor. The auger conveyor has a coolant-cooled housing and a coolant-cooled auger.

2 Claims, 9 Drawing Figures 4,400,150

FLUIDIZED BED COMBUSTOR DISTRIBUTOR PLATE ASSEMBLY

BACKGROUND OF THE INVENTION

This invention relates to fluidized bed combustion, and more particularly to a fluidized bed combustion apparatus uniquely constructed to combust poor quality solid particulate fuel on a generally continuous basis, with concomitant removal of hot noncombustible substances.

Present technology has produced fluidized bed combustion apparatuses of many forms and features.

Combustion of poor quality fuels such as coal having about fifty percent or so of noncombustibles is, however, particularly bothersome because of the rapid accumulation of noncombustible debris in the apparatus. Yet use of such fuels for energy production would be particularly advantageous.

SUMMARY OF THE INVENTION

A fluidized bed combustor particularly suited for combustion of a variety of fuels, including poor quality coal, e.g. having over fifty percent stone and ash content. The combustor is capable of continuous or intermittent feed and concomitant classification of and discharge of hot debris. The classification function can be regulated via combustion air flow control through shield covered slots in sloped bottom surfaces of the distributor plate. Yet the rate of combustion is not dependent on the amount of air flow through the classification slots in that flow is also caused to occur through risers projecting above the sloped surfaces into the bed. The relative amounts of air flow through the slots and the risers is regulated by regulating the share of air flow to a first plenum for the slots and a second plenum for the risers.

Classified hot debris is subject to continuous removal after classification by dropping down cooled drop tubes to an auger conveyor system employing cooled auger jackets and augers. The heat from the coolant is preferably salvaged for energy efficiency.

DESCRIPTION OF THE PREFERRED EMBODIMENT

Figure 1:
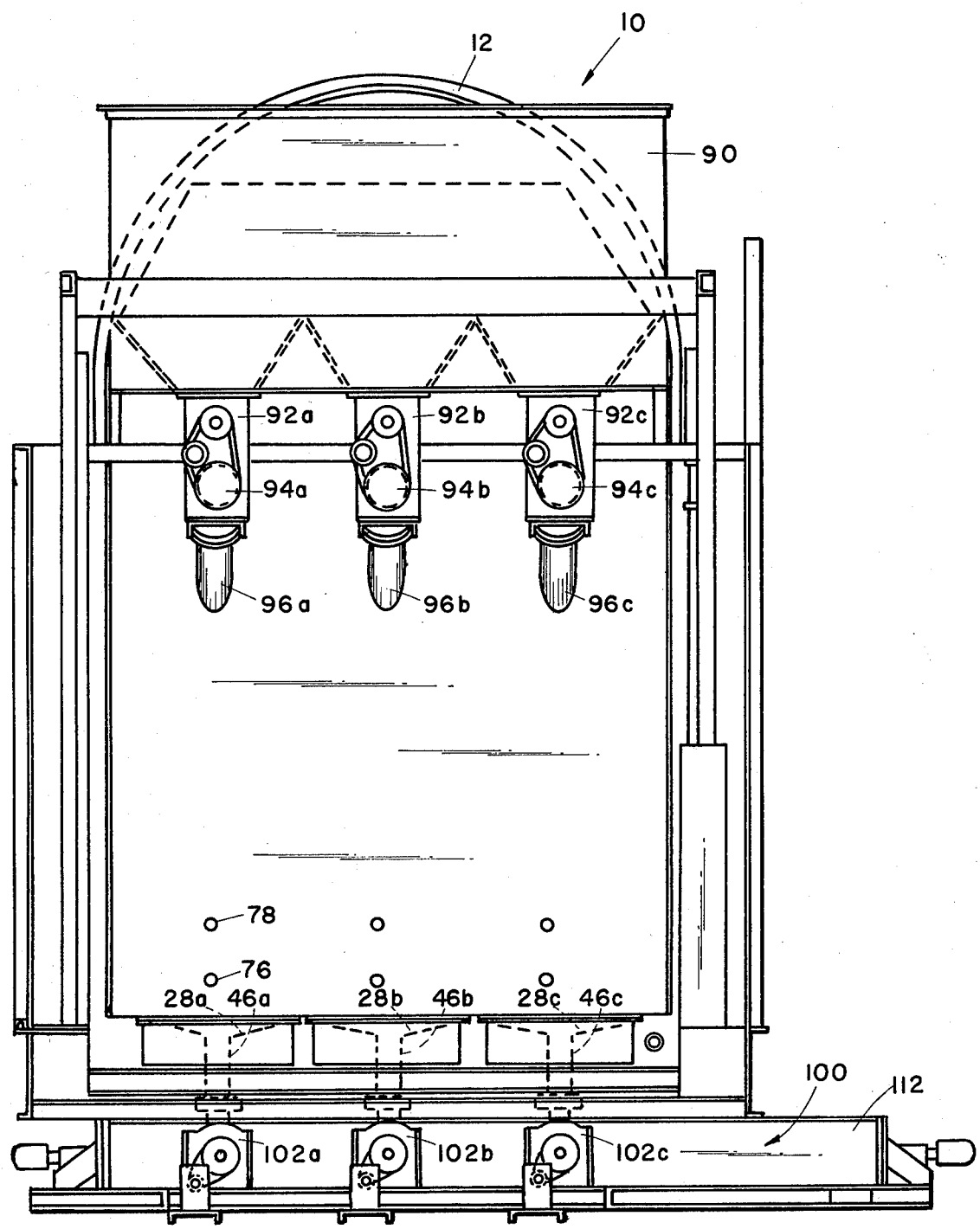
FIG. 1 is an end elevational view of a boiler employing the fluidized bed combustor of this invention.

Referring now specifically to the drawings, the boiler assembly 10 (FIGS. 1 and 2) employing the invention herein includes a pressure vessel 12 of conventional type. Associated therewith is a typical smoke box 14 leading to the exhaust stack 16. The pressure vessel is to contain water or other heat transfer fluid which may be converted to steam or vapor. It is to include conventional controls such as water gage glass 18, feed water supply valve 17 with feed water controls, low water cut-off, and high and low water alarms 20. It has surface blow off device 22 and a main steam outlet 24. The particular arrangement of the heat exchanger in the boiler can vary considerably and may for example be of the type shown in U.S. Patent application Ser. No. 5072 filed Jan. 22, 1979. The heat for generation of the steam is supplied from the novel fluidized bed combustor assembly 26 in the lower portion of the apparatus.

Figure 3:
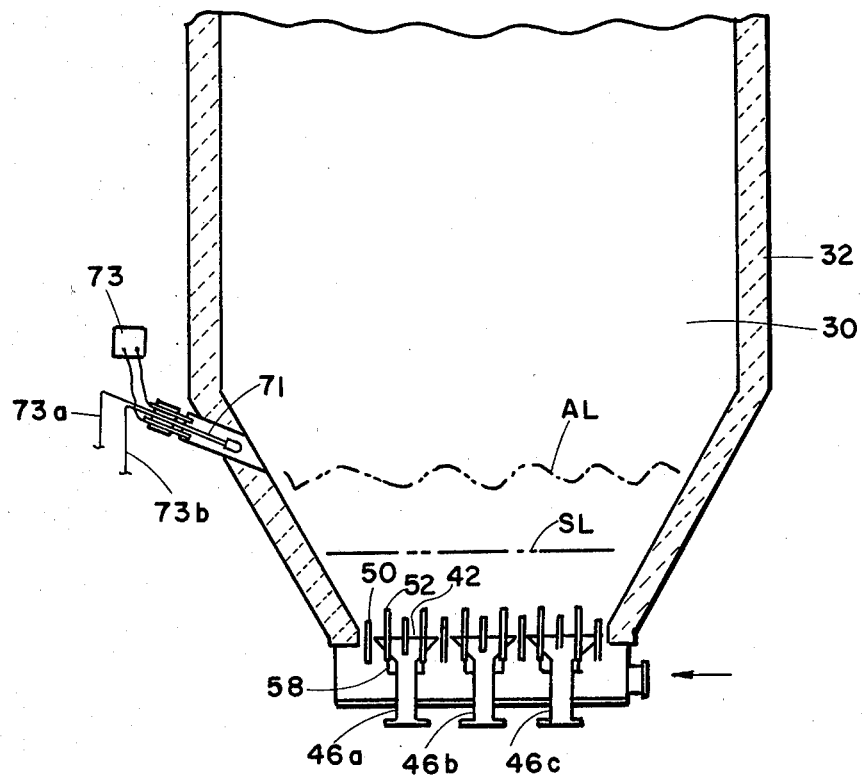
FIG. 3 is a fragmentary elevational sectional view of the combustor of this invention.
Figure 5:
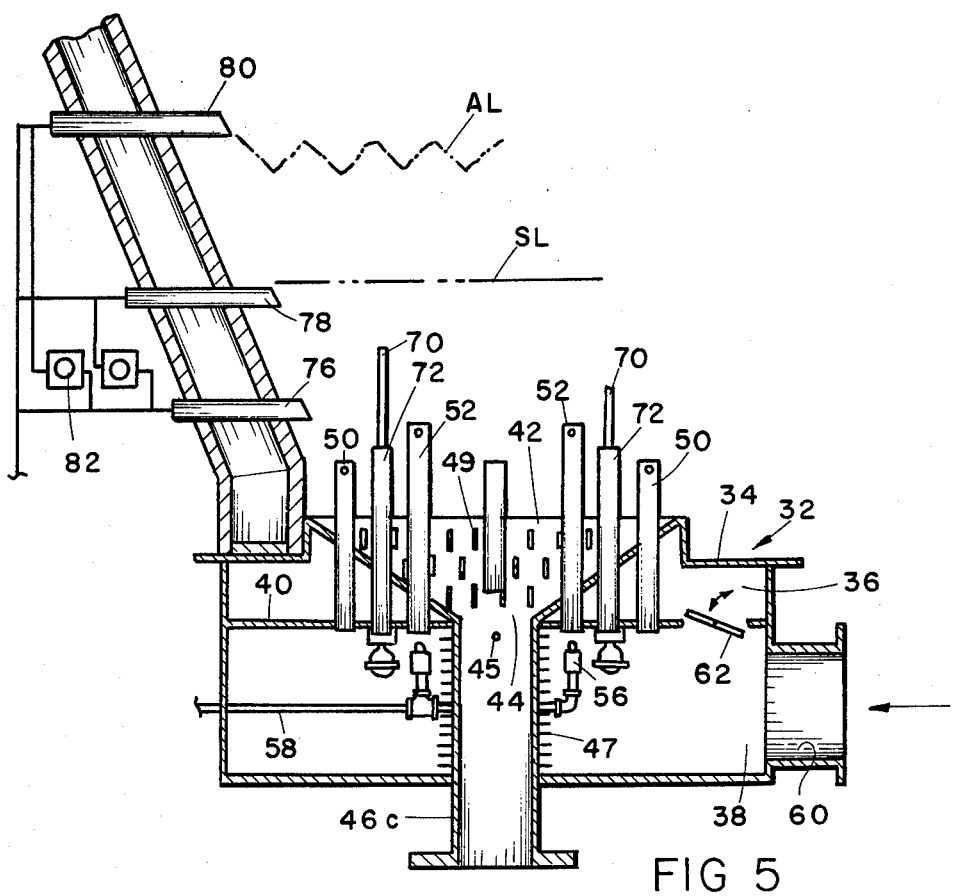
FIG. 5 is an enlarged fragmentary sectional elevational view of the lower portion of the combustor.
Figure 6:
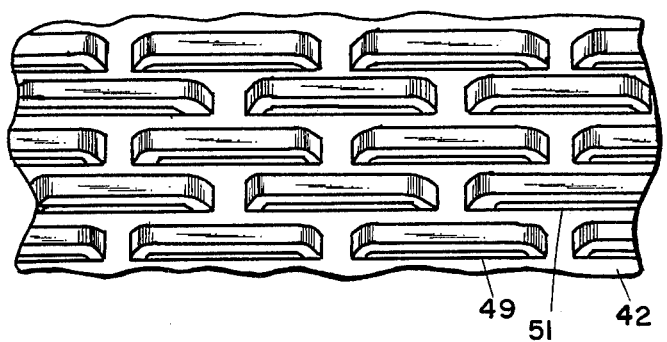
FIG. 6 is a fragmentary enlarged perspective of a portion of the distributor plate surface of the combustor.
Figure 7:
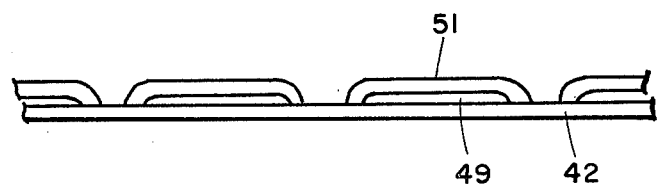
FIG. 7 is a fragmentary enlarged sectional view of a portion of the distributor plate in FIG. 6.

In the embodiment shown (FIG. 1), the combustor is composed of three adjacent fluidized bed zones 28a, 28b and 28c, each capable of independent operation. In operation, each bed would include a fluidizable bed material such as silica sand or the like. This multiple of fluidized beds is located at the bottom of a combustion chamber 30 (FIG. 3), defined by chamber walls 32 which typically would be refractory lined (as depicted in FIG. 3) or water filled (as depicted in FIG. 5). The lower portion of the walls converge downwardly as depicted.

At the bottom of the combustion chamber is the multiple distributor plate arrangement, with one distributor plate assembly for each fluidized bed. For convenience, only one of these will be described in detail, the others being basically the same. Each distributor plate assembly 32 (FIG. 5) includes a housing 34 which defines a first upper plenum 36 and a second lower plenum 38 separated by a partition 40. Projecting down into the upper plenum 36 is an inverted frustopyramidally-shaped distributor plate surface area 42 terminating at its lower end in a central opening 44 communicating with a vertical drop tube, e.g. 46c depending therefrom for controlled removal of hot debris from the fluidized bed during operation as described hereinafter. This surface area 42 is specially formed with pierced or punched elongated slots 49 and integral vertically offset elongated shields 51 thereover, the shields being formed by the metal offset from the plate surface during formation of the slots. The long dimension of the individual slots is oriented toward the central opening 44 in the bottom of the distributor plate, i.e. down the sloping surfaces thereof. The slots and shields form laterally oriented air outlets. The technique for displacing metal plates in this fashion is conventional in the metal working industry. As will be explained hereinafter, the combustion air flow through these outlets supplies a portion of the combustion air for the respective fluidized bed, also serving as a portion of the fluidizing air for the bed, and further causing particulate classification along the sloped surfaces of this surface area. The slots and outlets communicate with the upper first plenum 36 so that air flow through the plenum emerges into the combustion chamber through these outlets.

Projecting upwardly from the lower second plenum 38 (FIG. 5) to an elevated position above the surface 42 is a plurality of riser tubes, usually cylindrical, formed of a first set of riser tubes 50 and a second set 52. Both sets of riser tubes project substantially above the surface area 42, with risers 52 projecting above risers 50. Risers 52 have air outlet openings adjacent the top thereof located above the air outlet openings adjacent the top of risers 50. Both sets of risers have inlet openings at the bottoms communicant with plenum 38 for flow of the other portion of combustion and fluidizing air therethrough into the combustion chamber. Also adjacent the bottom of risers 52 is a plurality of respective liquid fuel nozzles 56 supplied by liquid fuel inlet conduit 58 for introduction of a light liquid fuel such as alcohol, gasoline, kerosene, styrene, and/or other light liquid hydrocarbon fuels. The nozzles are oriented to spray the fuel onto the interior walls of the riser tubes 52 for conductance of the fuel by the rising film principle up through the tubes along with the air flowing upwardly therethrough, and discharge of both into the bed through the same outlets.

Figure 4:
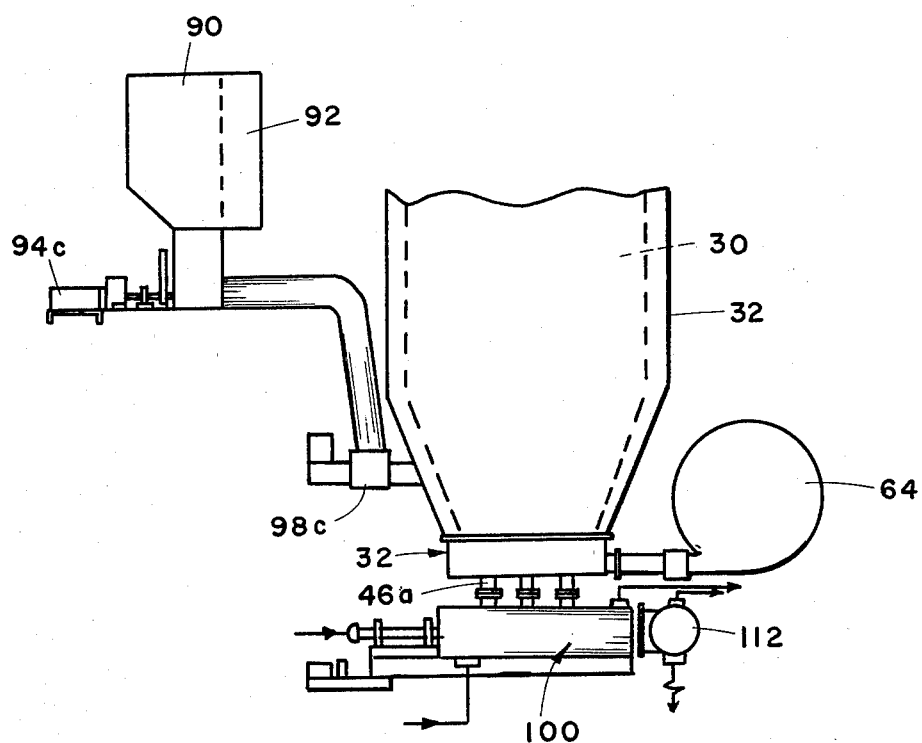
FIG. 4 is a fragmentary elevational view of the combustor in FIG. 3, also showing the solid fuel feed mechanism and the debris removal mechanism.

Air is propelled into the housing under force through inlet 60 (FIG. 5) and in the specific embodiment depicted, into lower plenum 38. Means is provided for controlling the amount of the air which flows to the riser tubes and the amount which flows to the slots in surface 42. In the particular embodiment depicted, this is done by a pivotably movable baffle or damper 62 positioned in partition 40 between plenum 38 and plenum 36, to thereby regulate the proportion of the air which flows to the first plenum and thus out slots 49 as opposed to the portion which flows from plenum 38 to riser tubes 50 and 52. This proportioning control means could alternatively be positioned upstream of both plenums such that the air to plenum 36 passes directly thereto rather than through plenum 38, or the air could be made to flow first to plenum 36, with part of it being controllably discharged to plenum 38. Each bed has its own such baffle or damper control. Each also has its own air supply means such as draft fan 64 (FIG. 4). If desired, additional air outlet ports 45 can be provided within the drop tube 44 to assist in the classification function to be described hereinafter.

Temperature measuring elements such as thermocouples 70 projecting up to different levels within the bed are employed to monitor the bed temperature at these levels. These thermocouples are supported by tubes 72 (FIG. 5) adjacent the riser tubes for the air and fuel, and connect to temperature monitoring indicators. These sensors can for example detect overheating which may result in sintering or glassing of the bed material. Such can activate an alarm, and/or effect safety shutdown.

The drop tube 46a, 46b, and 46c (FIG. 1) for the hot debris includes cooling fins 47 (FIG. 5) therearound, in contact with the air flowing through plenum 38. This not only maintains the drop tubes within a controlled temperature range but also preheats the combustion air for thermal efficiency. The lower end of each drop tube has a flange for connection to an inlet on the debris conveyor apparatus therebelow, and described hereinafter.

Also projecting through the wall of the combustion chamber 30 above the active bed level AL is an electric spark igniter 71 with controls 73 (FIG. 3), and light liquid fuel supply 73a and return 73b.

Monitoring of the bed level is achieved by vertically spaced level sensors projecting through the wall of the combustion chamber (FIG. 5), there being a lower level sensor impulse port 76, an intermediate level sensor impulse port 78 normally just below the slumped bed level SL, and an upper level impulse port 80 just above the active bed level AL. These level sensors 76, 78 and 80 are interconnected with transmitters 82 to indicate bed level. If desired, the sensors can be connected to automation bed level controls. Thus, if one or more of the beds is inactive, such that the bed material from an adjacent active bed slowly migrates into the lower level inactive bed, the decreased bed level of the active bed can cause the inactive bed to be fluidized for a limited time, without fuel combustion therein, to redistribute the particulate bed material back to the active bed. Alternatively, the sensing of a low or high bed can sound an alarm, start or stop under bed debris removal equipment, start or stop fuel in feed to the bed, and/or start or stop the forced draft fan for the bed.

The main fuel for the fluidized bed combustor is typically a solid particulate fuel such as coal. This solid fuel is preferably supplied from a fuel hopper 90, optionally including a limestone hopper 92 associated therewith for control of sulfur emissions in known fashion. The individual fluidized beds are respectively supplied with fuel from this hopper by individual feed augers in housings 92a, 92b and 92c (FIG. 1) driven by appropriate motors 94a, 94b, and 94c, to advance the feed down appropriate chutes 96a, 96b or 96c, dropping the fuel into each bed. In the preferred apparatus, the individual augers powered by motors 94a, 94b, and 94c are metering screws, with motor 94a, 94b, and 94c being of variable speed type. These cooperate with individual constant speed motor-driven screws, e.g. 98c (FIG. 4) which push the feed into the individual beds. The fuel feed can be variable speed, intermittent or continuous as necessary.

Figure 2:
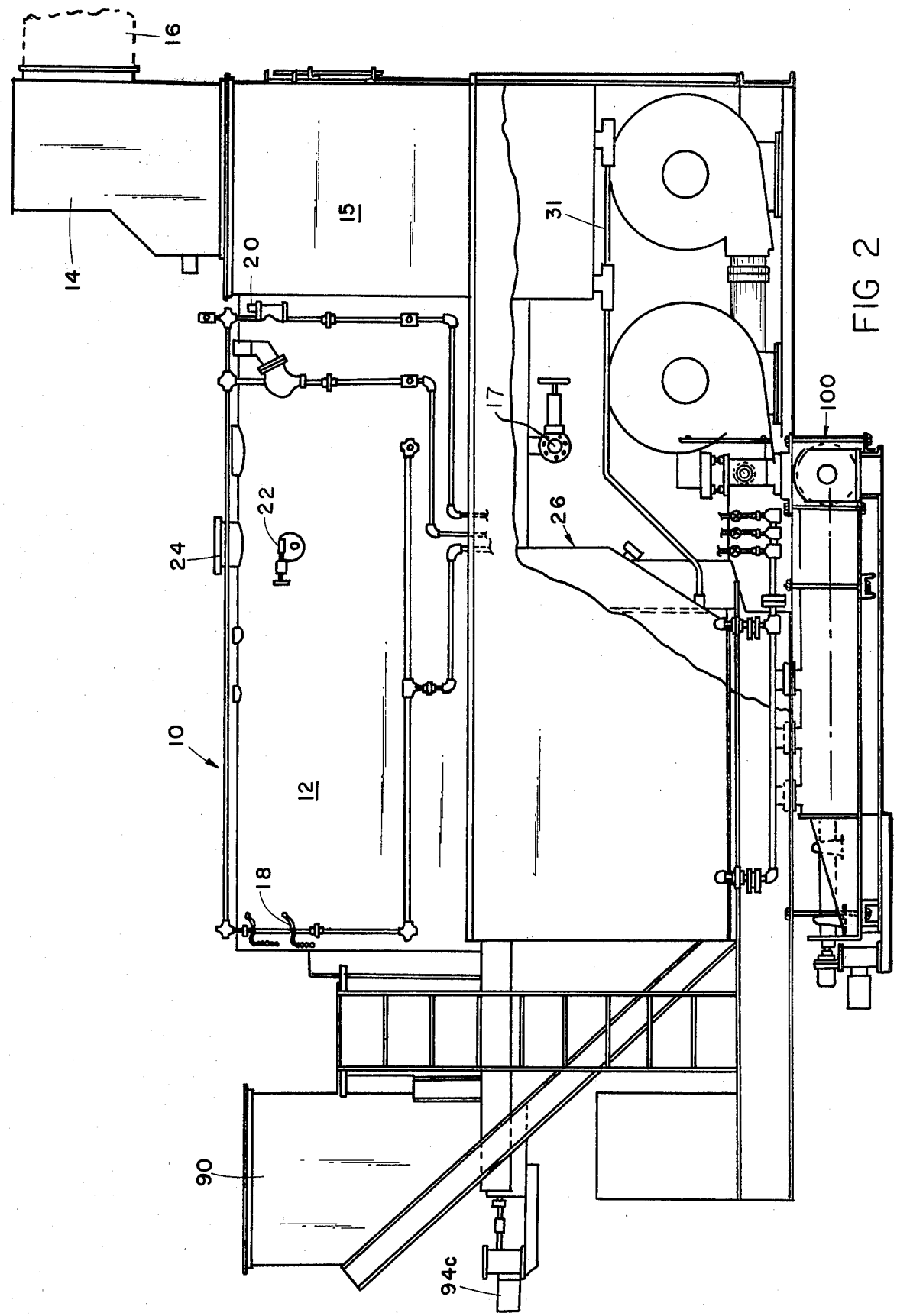
FIG. 2 is a side elevational view of the boiler in FIG. 1.
Figure 8:
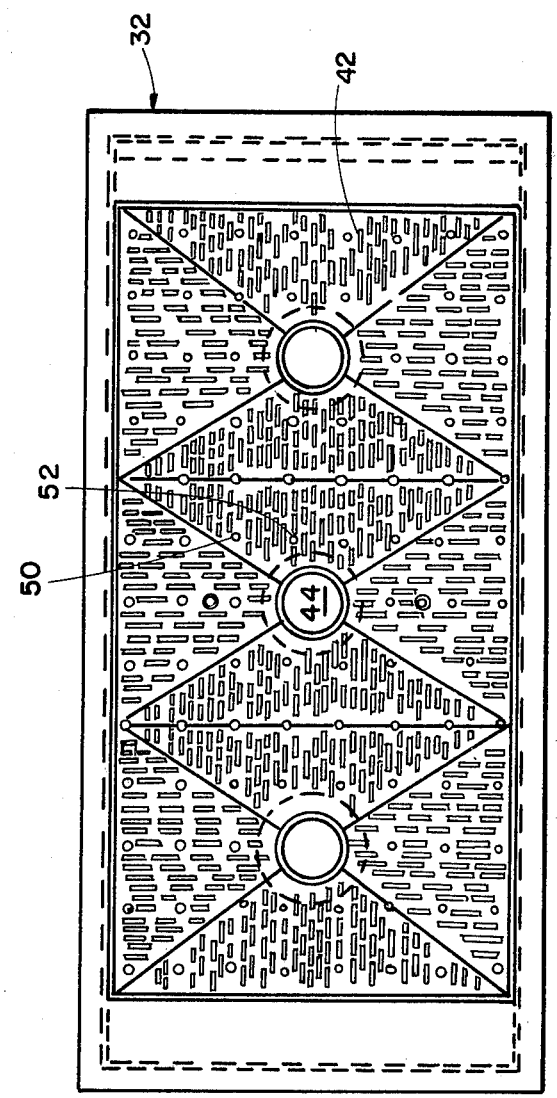
FIG. 8 is a plan view of the distributor plate assembly.
Figure 9:
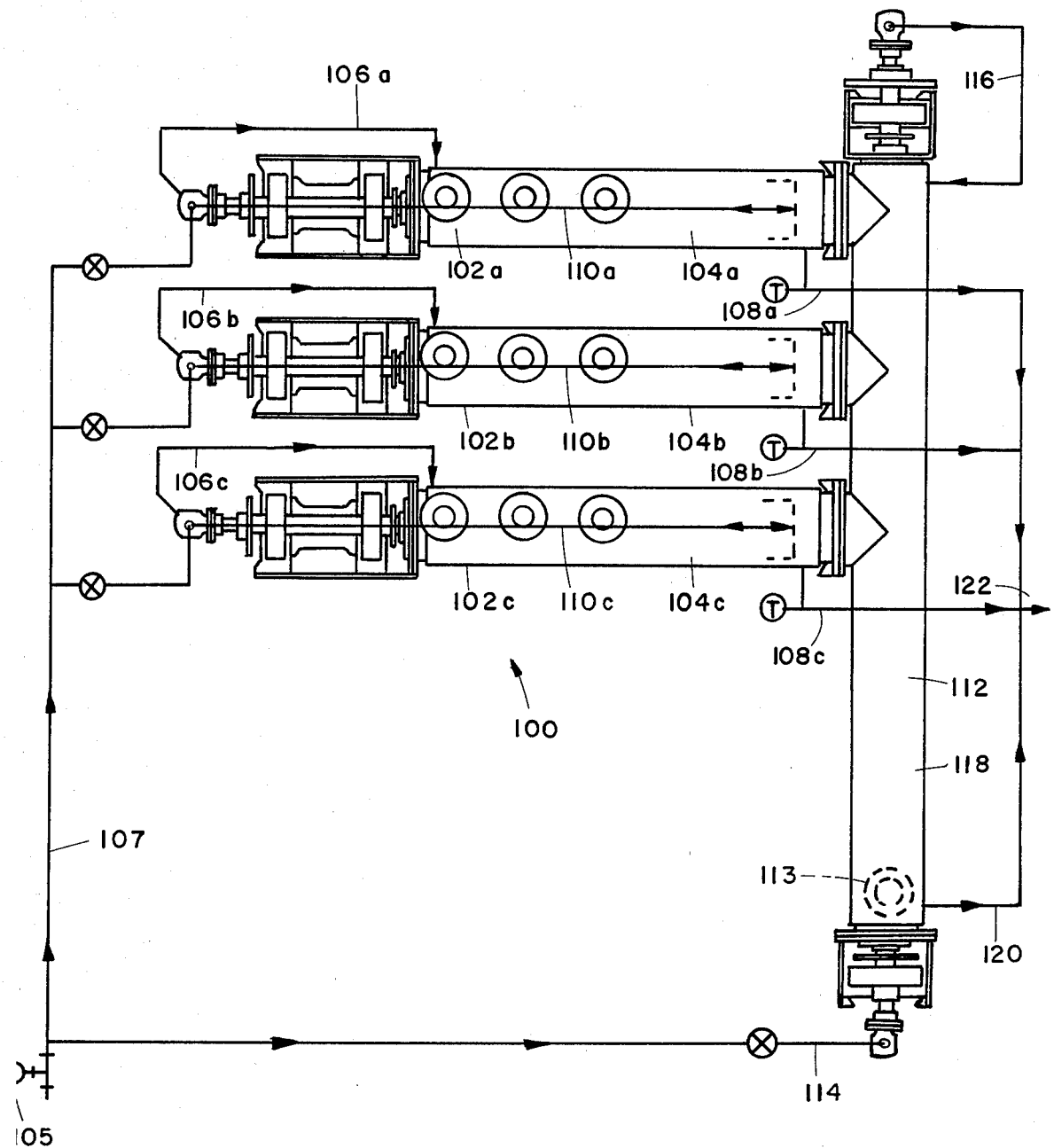
FIG. 9 is a plan view of the debris removal conveyor assembly.

In the particular embodiment depicted, the hot debris discharged from the fluidized beds through the drop tubes enters a water cooled conveyor system 100 (FIG. 1, FIG. 9). More specifically, a plurality of conveyors 102a, 102b and 102c have upper openings communicating with the lower ends of the drop tubes to receive the hot noncombustible debris therefrom. These conveyors include housings 104a, 104b and 104c (FIG. 9) with coolant flow passages, usually for water, and an auger with coolant flow passages, usually for water. More specifically, (FIG. 8) a cold water source 105 supplies coolant to line 107 to the individual auger passages 110a, 110b and 110c, which then flows back from the augers to housings 104a, 104b, and 104c through lines 106a, 106b, and 106c. The coolant discharges through lines 108a, 108b, and 108c to outlet 122.

The hot debris is preferably advanced by these conveyors to a cross conveyor 112 (FIG. 9) which also has a water cooled auger using inlet line 114 from source 105, the output from the auger flowing through line 116 to water cooled housing 118 to be discharged therefrom through line 120 to outlet 122, to be fed to the boiler, if desired, for thermal efficiency.

During operation, assuming hopper 90 contains particulate fuel such as coal, the individual beds are selectively fluidized by forceful propelling air from the draft fans, e.g. 64 into the selected distributor plate assemblies and more specifically into the lower plenums 38 thereof. The individual dampers 62 are regulated to achieve desired air flow proportioning. One portion of the air is propelled into the combustion chamber out openings 49 and the other portion through lateral outlets in the tops of riser tubes 50 and 52, to fluidize the particulate bed. As the bed becomes fluidized, light liquid fuel such as alcohol is injected through line 58 and out nozzles 56 into the lower open ends of riser tubes 52 for conductance thereof with the air up the walls of the riser tubes 52 and into the bed where the vaporized fuel is ignited by igniter 71. This feeding of the liquid fuel is continued until the bed temperature is elevated to a desired range, at which time the fluidized bed is ready for introduction of the solid particulate fuel from hopper 90. As the solid fuel is selectively introduced by individual drive motors 94a, 94b and 94c, damper 62 for each is adjusted to optimize the relative air flow through the riser tubes and through the slot openings in the distributor plate surface. As combustion of the solid fuel stabilizes, the supply of light liquid fuel is decreased or terminated, causing continued operation to be solely by combustion of the solid fuel. If desired, the system can be automatically shut down in response to excess temperatures detected by temperature sensors 70. The solid fuel infeed is preferably controlled in response to pressure controls of the boiler, i.e. adding more fuel if more heat is required. Combustion of the solid fuel causes creation of ash and concentration of small stones and/or other noncombustible substances, i.e. debris present in the fuel. This is continuously removable on a controlled basis during operation. For example, the unit has been demonstrated to successfully operate on poor quality coal having more than fifty percent mineral and ash content, yet without the typically expected necessity of shutdown every few hours to clean out the large quantity of debris. Rather, the unit automatically eliminates the debris on a continued basis. This is done by the special structure and arrangement of the distribution plate assembly. The controlled portion of air through outlets 49 of the plate causes dynamic, continuous classification of the particulates along the sloped surface area 42, and can be adjusted for the fuel encountered without altering the total combustion air input since the remainder is injected through the riser tubes projecting above surface 42. The air flow at this inverted frustopyramidal surface causes controlled classification of the particles based upon size, the larger hot particles slowly migrating down the slope to the drop tube, and dropping down the cooled tubes to the water cooled conveyor system. Conveyors 102a, 102b, and 102c advance the debris while cooling it further, to cross conveyor 112 which cools and propels it to discharge outlet 113.

The finer particles of uncombusted or partially combusted materials migrate upwardly into the fluidized bed for complete combustion. Very fine particles of ash or fuel which may be carried with the exhaust are separated out of the exhaust by a conventional separator or precipitator in housing 15 below the smoke box, and recycled back through return line 31 (FIG. 2) to the fluidized bed.

The detail features of the invention can be modified somewhat to suit the particular installation. The invention is intended to be limited only by the appended claims and the equivalents thereto.

The embodiments of the invention in which an exclusive property or privilege is claimed are defined as follows.

1. A fluidized bed combustor comprising:
    a combustion chamber;
    a distributor plate assembly at the bottom of said chamber, including a distributor plate with downwardly sloping surfaces; said surfaces having slots with vertically spaced shields thereabove to form laterally oriented air flow openings to said chamber to cause particle classification along said sloped surfaces; air flow riser tubes in addition to said shielded slots, projecting up through said surfaces to a position elevated thereabove, having air inlets at the bottom and outlets at the top;
    means for supplying forced air to said slots for the three purposes of classification, fluidization, and combustion, and to said risers for the two purposes of fluidization and combustion; and
    means for controlling classification of the fluidized bed independent from fluidization thereof comprising means for regulating the proportion of air flow to said slots with respect to the air flow to said riser whereby variation of the relative rate of air flow through said slots and said risers changes the classification relative to the fluidization of the fluidized bed.

2. The combustor in claim 1 wherein said slots and shields are elongated and oriented with the long dimension thereof oriented down said sloping surfaces.

* * * * *